(12) United States Patent
Hosur et al.

(10) Patent No.: US 7,668,075 B2
(45) Date of Patent: Feb. 23, 2010

(54) VERSATILE SYSTEM FOR DUAL CARRIER TRANSFORMATION IN ORTHOGONAL FREQUENCY DIVISION MULTIPLEXING

(75) Inventors: Srinath Hosur, Plano, TX (US); Jaiganesh Balakrishnan, Kamataka (IN); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 657 days.

(21) Appl. No.: 11/099,317

(22) Filed: Apr. 5, 2005

(65) Prior Publication Data

US 2005/0232137 A1 Oct. 20, 2005

Related U.S. Application Data

(60) Provisional application No. 60/559,845, filed on Apr. 6, 2004.

(51) Int. Cl.
*H04J 11/00* (2006.01)
(52) U.S. Cl. .................. 370/208; 370/203; 370/252; 370/210; 375/130
(58) Field of Classification Search .......... 370/208, 370/203, 210, 252, 342, 330; 375/260, 130
See application file for complete search history.

(56) References Cited

U.S. PATENT DOCUMENTS

| | | | | |
|---|---|---|---|---|
| 6,442,129 B1* | 8/2002 | Yonge et al. | ............. | 370/204 |
| 6,785,520 B2 | 8/2004 | Sugar et al. | | |
| 7,376,117 B2* | 5/2008 | Erlich et al. | ............. | 370/343 |
| 7,379,417 B2* | 5/2008 | Agrawalla et al. | ......... | 370/208 |
| 2002/0085641 A1 | 7/2002 | Baum | | |
| 2003/0133473 A1* | 7/2003 | Manis et al. | ............. | 370/480 |
| 2004/0063399 A1* | 4/2004 | Milbar | ............... | 455/3.01 |
| 2004/0151109 A1* | 8/2004 | Batra et al. | ............. | 370/208 |
| 2004/0190641 A1* | 9/2004 | Ojard | ............... | 375/261 |
| 2005/0047444 A1* | 3/2005 | Park et al. | ............. | 370/480 |
| 2005/0185669 A1* | 8/2005 | Welborn et al. | ........... | 370/465 |
| 2005/0195765 A1* | 9/2005 | Sharon et al. | ............. | 370/330 |
| 2006/0274846 A1 | 12/2006 | Bauch | | |

FOREIGN PATENT DOCUMENTS

WO 2005086445 A2 9/2005

OTHER PUBLICATIONS

Anuj Batra et al; IEEE P802.15; Wireless Personal Area Networks; Jul. 2003; IEEE P802.15-03/268r0; pp. 1-71.
Anuj Batra et al; Design of a Multiband OFDM System for Realistic UWB Channel Environments; IEEE Transactions on Microwave Theory and Techniques, vol. 52, No. 9, Sep. 2004; pp. 2123-2138.

* cited by examiner

*Primary Examiner*—Kwang B Yao
*Assistant Examiner*—Nguyen Ngo
(74) *Attorney, Agent, or Firm*—Steven A. Shaw; W. James Brady; Frederick J. Telecky, Jr.

(57) ABSTRACT

Embodiments of the invention provide a versatile system for selectively spreading carrier data across multiple carrier paths within an Orthogonal Frequency Division Multiplexing (OFDM) system, particularly an ultra-wideband (UWB) system. The present invention provides a data input, which passes data to a randomizer. The data then passes to a convolutional code function (206), the output of which is punctured by puncturing function. An interleaver function receives the punctured code data, and cooperatively operates with a mapper element to prepare the coded data for pre-transmission conversion by an IFFT. The mapper element comprises a dual carrier modulation function, which associates and transforms two punctured code data elements into a format for transmission on two separate signal tones.

20 Claims, 1 Drawing Sheet

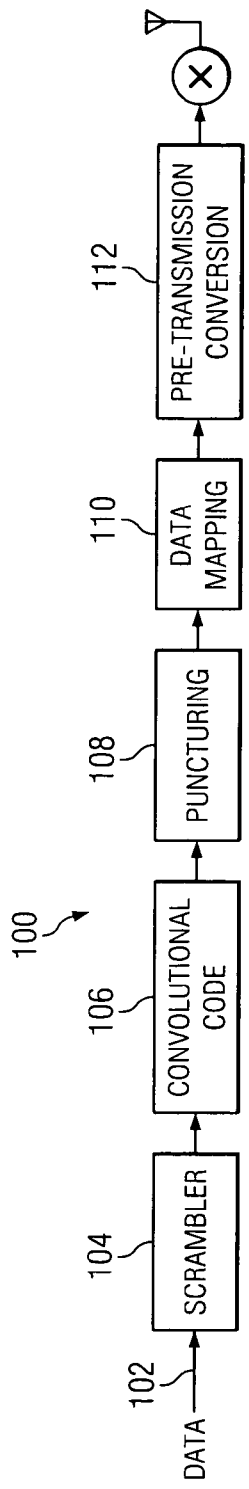
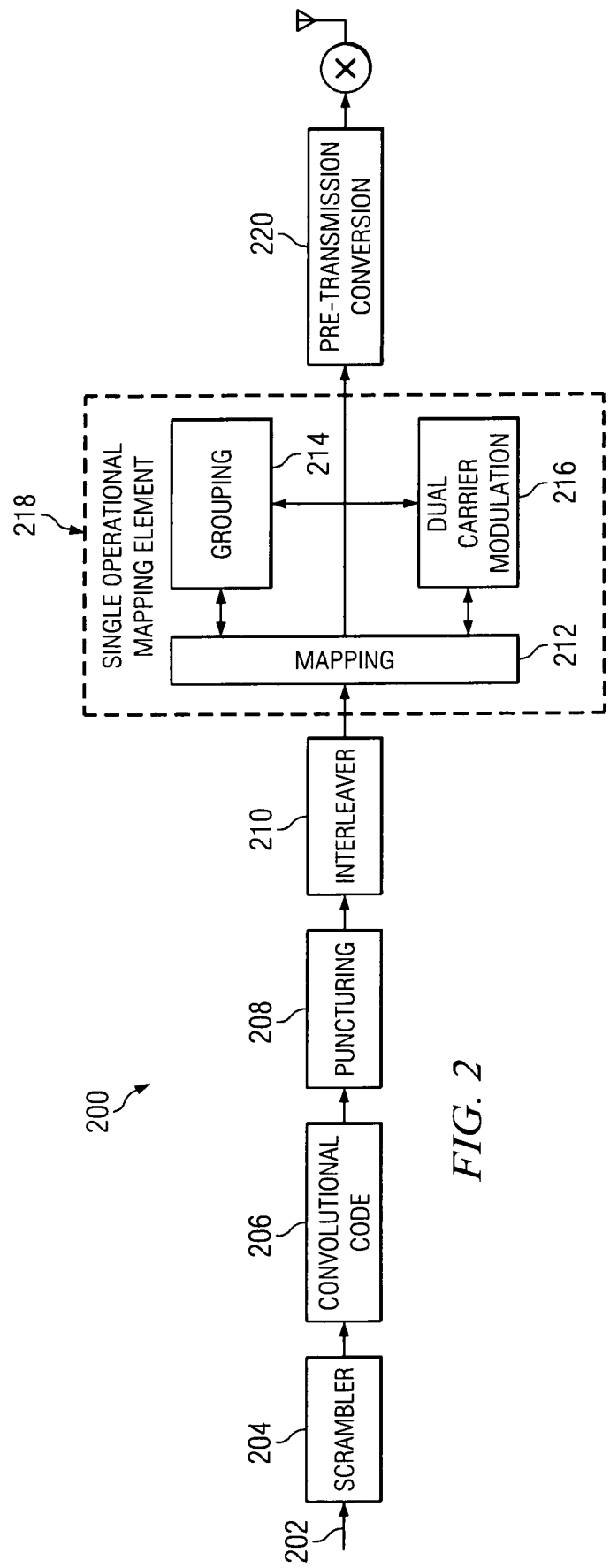

VERSATILE SYSTEM FOR DUAL CARRIER TRANSFORMATION IN ORTHOGONAL FREQUENCY DIVISION MULTIPLEXING

CROSS REFERENCE TO RELATED APPLICATIONS

This application claims priority of U.S. Provisional Application No. 60/559,845, filed Apr. 6, 2004. This application has inventors-in-common and is assigned to Texas Instruments Incorporated—assignee of U.S. patent application Ser. No. 10/688,169.

TECHNICAL FIELD OF THE INVENTION

The present invention relates generally to the field of wireless communications and, more particularly, to structures and methods for maximizing utilization and efficiency of communications utilizing orthogonal frequency division multiplexing through frequency domain transformations.

BACKGROUND OF THE INVENTION

Increasing demand for more powerful and convenient data and information communication has spawned a number of advancements in communications technologies, particularly in wireless communication technologies. A number of technologies have been developed to provide the convenience of wireless communication in a variety of applications, in various locations. This proliferation of wireless communication has given rise to a number of manufacturing and operational considerations. In most cases, however, wireless communications systems have at least one common denominator—the need or intent to maximize data transfer rates.

Since wireless communications rely on over-the-air (OTA) transmissions, wireless systems and their operation are subjected to a number of environmental interferences, as well as regulatory requirements and restrictions. These regulatory influences can vary considerably, and even conflict, across different countries or regions. Wireless device manufacturers and service providers often develop industrial standards to define specific communication schemes, and to help reconcile competing or conflicting approaches thereto. Environmental interferences can vary from naturally occurring phenomena to conflicting wireless transmissions. The proliferation of wireless communication has resulted in a number of disparate technologies that may operate in adjacent, partially overlapping, or overlapping frequency ranges or channels. Wireless device manufacturers and service providers must therefore also comprehend potential performance and reliability degradations that may result from frequency range conflicts.

Among recently emerging communication technologies—especially those targeted at or intended for high data transfer rates—various ultra-wideband (UWB) technologies are gaining support and acceptance. UWB technologies are commonly utilized for wireless transmission of video, audio or other high bandwidth data between various devices. Generally, UWB is utilized for short-range radio communications—typically data relay between devices within approximately 30 feet—although longer-range applications may be developed. A conventional UWB transmitter generally operates over a very wide spectrum of frequencies, several GHz in bandwidth. UWB may be defined as radio technology that has either: 1) a spectrum that occupies bandwidth greater than 20% of its center frequency; or, as it is more commonly understood, 2) a bandwidth $\geq$ 500 MHz.

UWB systems commonly utilize a modulation scheme, known as Orthogonal Frequency Division Multiplexing (OFDM), to organize or allocate data transmissions across extremely wide bandwidths. OFDM schemes are commonly utilized, not only in UWB systems, but also in high-bandwidth communications systems and protocols such as 802.11 (a).

Often, particularly in UWB systems, OFDM schemes are supplemented by dividing a given frequency range into multiple sub-bands. Systems that utilize these multiple sub-bands in combination with OFDM modulation are commonly known as Multi-band OFDM. Multi-band OFDM (MBO-FDM) in a UWB system provides relatively low-power, broad-spectrum communication that enables high bandwidth data transfer.

Considering UWB as an illustrative example, the Federal Communications Commission (FCC) of the United States has allocated the spectrum from 3.1 GHz-10.6 GHz for UWB radio transmissions. This UWB frequency allocation is unlicensed, leaving the spectrum open to a number of potentially conflicting technologies. Due to this unlicensed nature, UWB devices and systems have to contend with both pre-existing and future-developed services that occupy adjacent frequency bands or share some portion of the same frequency band. In order to successfully co-exist, UWB systems should be capable of adapting to certain spectral masks—selectively limiting transmissions in certain spectral sub-ranges.

Moreover, the relative strength (i.e., power) of UWB signals is also limited to a transmit power of −41.25 dBm/MHz. Due to this relatively low-power, short-range nature of UWB, even a nominal degree of signal fading or interference from an adjacent frequency band can significantly impact the signal integrity of a given tone.

In the increasingly common situation where a conventional OFDM system (e.g., a UWB system) must account for one or more spectral masking requirements, certain sub-ranges of a frequency band cannot be utilized—decreasing the system's potential data transfer bandwidth. In order to achieve a desired high bandwidth data transfer, over a now-limited available sub-portion of a channel, the conventional OFDM system has to maximize the raw volume of data transferred over the available channel sub-portion. Unfortunately, however, conventional OFDM systems utilize a number of data coding and redundancy techniques for error correction and data integrity purposes. Although these techniques improve the reliability and integrity of data transmissions, by accounting or correcting for signal noise or interference, they reduce effective data transfer bandwidth by significant amounts. Thus, wireless system designers utilizing OFDM techniques may often face a tradeoff between achieving optimally high data transfer rates and ensuring data integrity or reliability.

As a result, there is a need for a system that provides optimal data throughput in OFDM-based communication technology while providing reliable data integrity—one that maximizes system utilization of all available sub-portions of a given wireless transmission frequency range—in an easy, efficient and cost-effective manner.

SUMMARY OF THE INVENTION

The present invention provides a versatile system, comprising various structures and methods, for optimizing the utilization, efficiency, and reliability of OFDM-based communications, through selective frequency domain transformation prior to transmission. The system of the present invention provides a frequency domain transformation for a group of signal sub-carriers, prior to transmission, in a manner that effectively spreads sub-carrier energy across a group of sub-carriers. The present invention is readily adaptable to a number of design requirements and variables, and may be implemented in a variety of OFDM-based systems. The present invention thus provides optimal data throughput in OFDM-based communications in an easy, cost-effective manner.

The system of the present invention provides for selective spreading of carrier data across multiple carrier paths within an Orthogonal Frequency Division Multiplexing (OFDM) system, particularly an ultra-wideband system. The present invention receives data from a data input, which passes to a scrambler (or randomizer) function. The data then passes to a convolutional code function, the output of which is punctured by puncturing function. An interleaver function receives the punctured code data, and cooperatively operates with a mapper element to prepare the punctured code data for pre-transmission conversion by an IFFT. The mapper element comprises a dual carrier modulation function. The dual carrier modulation function associates two punctured code data elements and transforms those elements into a format for transmission on two separate signal tones.

More specifically, certain embodiments of the present invention provide an ultra-wideband wireless communications system having a data input, and a coding function adapted to receive and code the data. An interleaver function is adapted to receive coded data from the coding function, and to cooperate with a mapper element. The mapper element has a dual carrier modulation function. A pre-transmission conversion function receives coded data from the mapper element, and convert the coded data prior to wireless transmission of the data.

Other embodiments of the present invention provide an OFDM-based data transmission system. The OFDM system has a data input, and a coding function adapted to receive and code the data. A dual carrier modulation function is provided, and adapted to selectively transform the coded data. A pre-transmission conversion function receives the coded data, after transform by the dual carrier modulation function, and converts the coded data prior to its transmission.

Certain embodiments of the present invention further provide a method of modulating data within an OFDM-based communications system. An index separation factor is provided or determined. A first data element, having a first index value, is associated with a second data element, having a second index value—separated from the first index value by the separation factor. A column vector is formed having [first data element; second data element]. A transformation matrix is provided, and applied to the column vector, to render a transformed column vector. The transformed column vector is thereafter transmitted at tones corresponding to the first and second index values.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which:

FIG. 1 provides an illustration depicting one embodiment of an MBOFDM UWB system segment; and FIG. 2 provides an illustration depicting an embodiment of an MBOFDM UWB system segment in accordance with certain aspects of the present invention.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The present invention is hereafter illustratively described primarily in conjunction with the design and operation of an ultra-wideband (UWB) communications system utilizing an Orthogonal Frequency Division Multiplexing (OFDM) scheme. Certain aspects of the present invention are further detailed in relation to design and operation of a Multi-band OFDM (MBOFDM) UWB communications system. Although described in relation to such constructs and operations, the teachings and embodiments of the present invention may be beneficially implemented with a variety of data transmission or communication systems or protocols (e.g., IEEE 802.11(a)), depending upon the specific needs or requirements of such systems. The specific embodiments discussed herein are, therefore, merely demonstrative of specific ways to make and use the invention and do not limit the scope of the invention.

The present invention provides a versatile system of structures and methods that optimize the utilization, efficiency, and reliability of an OFDM-based communications system. The present invention provides this optimization through selective frequency domain transformation of a group of signal sub-carriers prior to transmission. The system of the present invention effectively spreads sub-carrier energy across a group of sub-carriers—mitigating signal diversity losses and improving system performance at high coding rates. The present invention is readily adaptable to a number of design requirements and variables, and may be implemented in a variety of OFDM-based systems. The present invention thus provides optimal data throughput in OFDM-based communications in an easy and efficient manner.

OFDM-based wireless communication systems commonly utilize a pre-transmission conversion function to convert a data signal from the frequency domain into the time domain, for OTA transmission over a wireless channel. During transmission over the wireless channel, some degree of signal noise (e.g., interference) is added to the time domain data signal. As the time domain signal is received, a post-transmission conversion function is utilized to convert the signal back into the frequency domain, for subsequent signal processing or communication. Often, such pre-transmission and post-transmission conversion functions take the form of Inverse Fast Fourier Transforms (IFFTs) and Fast Fourier Transforms (FFTs), respectively.

Within the context of an OFDM-based UWB system, a pre-transmission IFFT commonly has 128 points (or tones). Depending upon the type of communications system, or specific design or performance requirements, however, an IFFT may have any desired or required number of tones. In most embodiments, one hundred of those tones are used as data carriers, twelve are pilot carriers (i.e., carry data known to receiver that it uses to ensure coherent detection), ten are guard carriers, and six are null tones. The ten guard carriers may be configured to serve a number of concurrent or independent functions. For example, some portion of the guard tones may be configured to improve signal-to-noise ratios (SNRs), by loading those guard carriers with critical data (e.g., unreliable data) for redundant transmission. Some portion of the guard tones may be configured (e.g., left unutilized) as frequency guard bands, to prevent interference to or from adjacent frequency bands. Of the six null tones, one typically occupies the middle of the available signal spectrum (i.e., dc tone), and the others may be selectively configured or designated to conform to a desired spectral mask (e.g., UWB, 802.11, 802.16).

Within a MBOFDM system, data tones across different bands are typically loaded with quadrature phase-shift key (QPSK) data. For a high-throughput MBOFDM system, there are a number of techniques that may be used to manipulate or tailor system data rates. Typically, such systems employ some sort of convolutional code for error detection/correction purposes. For example, in a UWB MBOFDM system, an [R=⅓, k=7] convolutional code may be provided as a forward error correction (FEC) code. Such codes can be manipulated by various puncturing schemes to achieve a desired data rate (e.g., [R=¾, k=7] for 480 Mbps). In addition to code puncturing, techniques such as frequency domain spreading and time domain spreading may be employed to divide down to a desired data rate.

For purposes of background and explaining certain aspects of the present invention, reference is made now to FIG. 1, which provides a high level functional depiction of a transmission segment 100 of an MBOFDM UWB system. Data 102 is delivered to a scrambler function 104, in bit format. Function 104 operates on the data bits to approximate a randomization thereof. That data is then transferred to a convolutional code function 106, which converts the data into some desired code form—an [R=⅓, k=7] code form, for example.

The coded data is next transferred to a puncturing function 108 to reduce the coded bits, by some puncturing characteristic, to a desired punctured code equivalent. For example, if five data bits are converted into an [R=⅓, k=7] code form, fifteen coded data bits are transferred from function 106 to function 108. Function 108 reduces the fifteen data bits, delivered from function 106, by a puncturing characteristic of eight bits, and outputs 7 coded bits. If a desired punctured code equivalent is ¾, then three data bits are converted into nine coded data bits, and transferred from function 106 to function 108. Function 108 reduces the nine data bits, delivered from function 106, by a puncturing characteristic of five bits, and outputs four coded bits. Depending upon system requirements, the convolutional code form of function 106 and the puncturing characteristic of function 108 may be varied individually or cooperatively to render a desired punctured code equivalent (e.g., ½, ¾). Coded bits are output from function 108 to a data mapping function 110. Function 110 performs various arranging and mapping functions on the coded data prior to loading that data to pre-transmission conversion function 112. Function 110 may perform an interleaving function to load coded data bits to carrier tones such that adjacent coded bits are not on adjacent carrier tones. Function 110 may also convert the coded data bits to a QPSK format, and group the QPSK data according to the number of available data carrier tones (e.g., 100). In this instance, function 112 is an IFFT that converts the coded data from the frequency domain to the time domain, prior to transmission over a wireless channel.

Utilizing such an approach, a conventional MBOFDM UWB system at high data rates may experience increased bit error ratios (BER) or parity error ratios (PER). Since data is transferred over multiple bands, exposure to varying SNRs is increased. Depending upon the magnitude of the packet sizes transferred, and the SNR values experienced, BERs or PERs can increase significantly—representing a significant loss of performance in the system. Such losses, coupled with the performance losses introduced by techniques such as puncturing, significantly reduce the overall system efficiency.

Referring now to FIG. 2, certain aspects of the present invention are explained in relation to a high level functional depiction of a transmission segment 200 of an MBOFDM UWB system according to the present invention. Data 202 is delivered to a scrambler function 204, in bit format. Function 204 operates on the data bits to approximate a randomization thereof. That data is then transferred to a convolutional code function 206, which converts the data into some desired code form—an [R=⅓, k=7] code form, for example.

The coded data is next transferred to a puncturing function 208 to reduce the coded bits, by some puncturing characteristic, to a desired punctured code equivalent. For example, if five data bits are converted into an [R=⅓, k=7] code form, fifteen coded data bits are transferred from function 206 to function 208. Function 208 reduces the fifteen data bits, delivered from function 206, by a puncturing characteristic of eight bits, and outputs 7 coded bits. If a desired punctured code equivalent is ¾, then three data bits are converted into nine coded data bits, and transferred from function 206 to function 208. Function 208 reduces the nine data bits, delivered from function 206, by a puncturing characteristic of five bits, and outputs four coded bits. Depending upon system requirements, the convolutional code form of function 206 and the puncturing characteristic of function 208 may be varied individually or cooperatively to render a desired punctured code equivalent (e.g., ½, ¾).

Coded bits are output from function 208 to an interleaver function 210. Function 210 cooperates with a mapping function 212 and a grouping function 214. Function 210 is configured to load coded data bits to carrier tones within available sub-bands such that adjacent coded bits are not on adjacent carrier tones. Function 212 converts the coded data bits to a QPSK format. Grouping function 214 may utilize either a frequency domain spreading function or a time domain spreading function, in addition to a dual carrier modulation (DCM) function 216, to sort the coded QPSK data for loading on the carrier tones (e.g., 100 tones). Functions 212, 214 and 216 are implemented within a single operational mapping element 218. Element 218 may be implemented as a functional part of interleaver 210, or as a separate functional element. Once functions 210-216 have configured coded data in a desired arrangement, that data is then loaded to pre-transmission conversion function 220. In this embodiment, function 220 is an IFFT that converts coded data from the frequency domain to the time domain, prior to transmission over a wireless channel.

Dual carrier modulation function 216 provides a transform performed upon the QPSK data that optimizes data spreading over the tones, so as to optimize the likelihood of successful data recovery on at the receiver. For a given number of carrier tones (e.g., 100), function 216 parses the data within a single symbol and associates a given data element ($s_1$) with another data element ($s_A$) separated from ($s_1$) by some desired separation factor ($\alpha$). The separation factor may be selected or adjusted to account for a number of systems variables, such as tone fading characteristics for a particular wireless system. In a 100 carrier tone application, for example, a separation factor of 2 may be desired, to provide the maximum possible separation between ($s_1$) and ($s_A$). The value of A is determined by:

$$A = \frac{\text{No. of tones}}{\alpha} + 1 \quad (1)$$

Thus, for an application having 100 sub-carriers and a desired separation factor of 2, ($s_1$) is associated with ($s_{51}$), ($s_2$) is associated with ($s_{52}$), etc. These associated pairs of data elements are rendered as data symbols of the form of column vectors [$S_1$; $S_{51}$], [$S_2$; $S_{52}$] . . . [$S_K$; $S_L$]; where each data symbol is transmitted on both the (K) and (L) tones.

Thus, a 2 sub-carrier group has a pre-transmission data symbol, to be transmitted in the sub-carriers indexed as K and L, in the form of a column vector [SK;SL]. Transmission of this data could take the form of mapping [SK;SL] to sub-carriers K and L, applying an IFFT, adding either a zero-padded or a cyclic prefix, and then transmitting the resulting time-domain OFDM symbol. According to the present invention, however, a DCM transform (T) is first applied to [SK; SL], rendering a transformed symbol [YK;YL]—where [YK; YL]=T*[SK;SL]. T is an N×N transformation matrix, which may be provided as a wide variety of transform types. In this example, T may be chosen as a 2×2 orthogonal transform.

For this example, then, [YK;YL] is loaded to an IFFT, and transmitted over the wireless channel. On the receiving end of such a system, a signal received undergoes a number of routine operations, such as synchronization, cyclic prefix removal, and post-transmission conversion by an FFT. The received data symbol is now in the format of [RK;RL]. [RK; RL]=[HK*YK;HL*YL], which is equivalent to [HK, 0;0, HL]*[YK;YL]. [HK, 0;0, HL] represents some additive or transformative characteristic of the transmission channel (e.g., noise effects) that may be determined or estimated by, for example, transmitting a training information set known at the receiver. [HK, 0;0, HL]*[YK;YL]=[HK, 0;0, HL]*T* [SK;SL]; from which [SK;SL] may be extracted. The effective channel ($H_e$) at the receiver is [HK, 0;0, HL]*T. $H_e$ may be removed by either using standard inversion (ZF), an LMMSE-type channel compensation (which also accounts for noise variances on the two sub-carriers), or by using a MAP/ML decoder. In various embodiments, sub-carriers may be derived from a plurality of OFDM symbols. In various embodiments, the DCM transform (T) may be varied from one sub-carrier group to another, as well.

As previously noted, (T) may be easily extended to an N×N case, as an N×N matrix. In certain embodiments, for example, having an N×N transform, (M) sub-carriers in an OFDM symbol are divided into (M/N) groups of (N) sub-carriers. The transform (T) is applied to each of these sub-carrier groups. Different transforms (T1), (T2) . . . ($T_X$) may be applied to each of the (M/N) groups of sub-carriers, depending upon specific operational requirements or characteristics. In other embodiments, (M) sub-carriers may be divided into groups of ($N_1$), ($N_2$) . . . ($N_P$) sub-carriers, where ($N_P$)—the size of the sub-carrier grouping—is varied within an OFDM symbol, or between OFDM symbols. Different transforms (T1), (T2) . . . ($T_P$) may be applied to each group of sub-carriers, respectively. The DCM transforms may also be applied to any combination of data, pilot or null tones. The size and extract structure of transform (T) may also be time-varied within a given packet—i.e., between symbols—as well as across packets.

In certain embodiments of the present invention, where a MBOFDM system consists of 100 data tones in each OFDM symbol, (T) may be provided in one of several useful formats. As noted in the example described above, T=[2 1;1 −2] may be used in embodiments where each sub-carrier grouping consists of data tones at location K and K+50—i.e., where paired sub-carriers are separated by 50 tone locations prior to the insertion of a pilot tone. In other embodiments (T) may take the form [1 1;1 −1], [2 1;−1 2], or [cos θ sin θ;−sin θ cos θ], where θ takes some value between 0 and π/2. The transform (T) may also be a complex valued transform, such as [1 exp(jθ); exp(−jθ) 1], where θ takes some value between 0 and 2π. In various other embodiments, transform (T) may be provided or modified in a number of ways, such as interchanging rows or columns, negating a row or column, and conjugating a row or column. The selected format of (T) may be determined based on a number of factors—such as overall transmission efficiency or decoding scheme complexity—or various tradeoffs therebetween.

In certain alternative embodiments of the present invention, symbols of a sub-group may be "spread" by mapping each column vector to different, higher-order constellations. For example, in one embodiment, 2 symbols may be grouped and "spread" over 2 sub-carriers. In this embodiment, [SK; SL] is a symbol vector corresponding to tone indices K and L. C is a constellation, of cardinality (A), used by symbols SK and SL. In this embodiment, a MBOFDM system, constellation C is QPSK, with a cardinality of A=4. Symbol vector [SK; SL] is mapped to a new vector [YK; YL], where components YK and YL are derived from constellations C1 and C2, respectively. Constellations C1 and C2 have cardinalities of (A1) and (A2), respectively. (A1) and (A2) may be chosen such that they are larger than (A) and $\leq (A)^2$. For example, a MBOFDM system, (A1) and (A2) may be chosen to be 16, and constellation C1 and C2 may be chosen to be 16 QAM—having different mappings of [SK; SL] to C1 and C2.

Thus, by the present invention, the pre-transmission transform (T) provides an additional spreading domain. This provides an efficient sub-carrier spreading scheme for OFDM-based application—one that is readily adaptable to a wide variety of wireless communication applications. Data is efficiently paired, or otherwise grouped, for transmission on multiple sub-carriers, having a desired spread across the channel spectrum. This spreading decreases data errors due to loss or interferences at specific tones—significantly improving overall data accuracy and reliability. Moreover, a system according to the present invention may be adapted to account for varying channel conditions (e.g. interference spikes). Where sufficient transmitter or receiver technology exists, feedback and control systems may be implemented to dynamically change transform (T) as transmission conditions change. Additionally, transform (T) may be provided to optimize system performance for a particular parameter (e.g., PER, BER, SNR).

A number of variations are comprehended by the present invention. The embodiments and examples set forth herein are therefore presented to best explain the present invention and its practical application, and to thereby enable those skilled in the art to make and utilize the invention. However, those skilled in the art will recognize that the foregoing description and examples have been presented for the purpose of illustration and example only. For example, the system of the present invention may be effectively applied to single or multiple antenna systems. In other variations, the pre-transmission transform may be provided as a unitary transform matrix or an orthogonal transform matrix. The teachings and principles of the present invention are applicable or adaptable to wide variety of communications protocols (e.g., UWB, 802.11, 802.16). The description as set forth herein is therefore not intended to be exhaustive or to limit the invention to the precise form disclosed. As stated throughout, many modifications and variations are possible in light of the above teaching without departing from the spirit and scope of the following claims.

What is claimed is:

1. An ultra-wideband wireless communications system comprising:
   a data input;
   a coding function, adapted to receive data from the data input and code the data;
   an interleaver function, adapted to receive coded data from the coding function;
   a mapper element, having a dual carrier modulation function, adapted to cooperate with the interleaver function; and
   a pre-transmission conversion function, adapted to receive coded data from the mapper element and convert the coded data prior to transmission.

2. The system of claim 1, further comprising a scrambler function interposed between the data input and the coding function.

3. The system of claim 1, wherein the coding function further comprises a convolutional code.

4. The system of claim 3, wherein the coding function further comprises a convolutional code of an [R=⅓, k=7] form.

5. The system of claim 3, wherein the coding function further comprises a puncturing function, adapted to render coded data of a desired punctured code equivalent utilizing a puncturing characteristic.

6. The system of claim 5, wherein the punctured code equivalent is ¾ and the puncturing characteristic is eight bits.

7. The system of claim 1, wherein the mapper element comprises:
   a mapping function;
   a grouping function; and
   a dual carrier modulation function.

8. The system of claim 7, wherein the grouping function is adapted to utilize a frequency domain spreading function or a time domain spreading function, in addition to the dual carrier modulation function, to arrange coded data.

9. The system of claim 1, wherein the dual carrier modulation function comprises an N×N matrix transform.

10. The system of claim 1, wherein the dual carrier modulation function comprises a 2×2 matrix transform.

11. The system of claim 1, wherein the dual carrier modulation function comprises an orthogonal matrix transform.

12. The system of claim 1, wherein the dual carrier modulation function comprises a unitary matrix transform.

13. The system of claim 1, wherein the dual carrier modulation function comprises a matrix transform of [2 1;1−2].

14. The system of claim 1, wherein the dual carrier modulation function comprises a matrix transform of [2 1;−1 2].

15. The system of claim 1, wherein the dual carrier modulation function comprises a matrix transform of [1 1;1 −1].

16. The system of claim 1, wherein the pre-transmission conversion function comprises an Inverse Fast Fourier Transform.

17. An Orthogonal Frequency Division Multiplexing OFDM-based data transmission system comprising:
   a data input;
   a coding function, adapted to receive data from the data input and code the data;
   a dual carrier modulation function, adapted to transform coded data; and
   a pre-transmission conversion function, adapted to receive coded data, after transform by dual carrier modulation function, and convert the coded data prior to transmission.

18. The system of claim 17, wherein the OFDM-based data transmission system is a multi-band OFDM data transmission system.

19. The system of claim 17, wherein the OFDM-based data transmission system is an ultra-wideband data transmission system.

20. The system of claim 17, wherein the OFDM-based data transmission system is an 802.11 OFDM-based data transmission system.

* * * * *

UNITED STATES PATENT AND TRADEMARK OFFICE
CERTIFICATE OF CORRECTION

PATENT NO. : 7,668,075 B2
APPLICATION NO. : 11/099317
DATED : February 23, 2010
INVENTOR(S) : Hosur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1275 days.

Signed and Sealed this

Fourth Day of January, 2011

David J. Kappos
*Director of the United States Patent and Trademark Office*